(12) United States Patent  
Conner et al.

(10) Patent No.: US 8,199,318 B2
(45) Date of Patent: Jun. 12, 2012

(54) METHODS AND DEVICES FOR TESTING AN OPTICAL FIBER

(75) Inventors: Mark Edward Conner, Granite Falls, NC (US); Gerry Jay Harvey, Newton, NC (US)

(73) Assignee: Corning Cable Systems LLC, Hickory, NC (US)

( * ) Notice: Subject to any disclaimer, the term of this patent is extended or adjusted under 35 U.S.C. 154(b) by 490 days.

(21) Appl. No.: 12/283,674

(22) Filed: Sep. 15, 2008

(65) Prior Publication Data

US 2010/0066997 A1    Mar. 18, 2010

(51) Int. Cl.
*G01N 21/00* (2006.01)
(52) U.S. Cl. ...................................... 356/73.1
(58) Field of Classification Search .......... 356/73.1, 356/244–246; 385/88
See application file for complete search history.

(56) References Cited

U.S. PATENT DOCUMENTS

| | | | | |
|---|---|---|---|---|
| 5,164,588 A | * | 11/1992 | Marcus | 250/227.21 |
| 5,486,171 A | * | 1/1996 | Chou | 606/16 |
| 5,615,011 A | * | 3/1997 | Boisrobert et al. | 356/479 |
| 5,625,450 A | * | 4/1997 | Ikeno | 356/73.1 |
| 6,924,890 B1 | | 8/2005 | Vobian et al. | 356/73 |

* cited by examiner

*Primary Examiner* — Tarifur Chowdhury
*Assistant Examiner* — Abdullahi Nur

(57) ABSTRACT

Methods are provided including the steps of transmitting a beam of light through a length of the optical fiber, reflecting a transmitted beam of light at a second end of an optical fiber such that a highly reflective event reflects the light beam, and identifying the second end of the optical fiber by monitoring at least the reflected light beam. In further examples, devices are provided for removable mounting with respect to an end of an optical connector. Each device comprises a reflective surface configured to provide a highly reflective event to reflect a beam of light back through an optical fiber supported by the optical connector. In further examples, optical assemblies are provided that include an optical connector with an optical fiber and a device with a reflective surface configured to provide a highly reflective event.

21 Claims, 9 Drawing Sheets

METHODS AND DEVICES FOR TESTING AN OPTICAL FIBER

BACKGROUND

1. Field of the Invention

The present invention relates generally to methods and devices for testing, and more particularly to methods and devices for testing an optical fiber.

2. Technical Background

A conventional optical fiber is known to include one or more optical fiber segments in a wide variety of applications. For example, it is known to include segments between a central office and an end user. For instance, the optical fiber is known to include a feeder optical fiber segment extending between the central office and a distribution point. The optical fiber is also known to include a drop cable segment extending between the distribution point and an end user. The distribution point is further known to include a fiber splitter connecting the feeder optical fiber segment to the drop cable segment to transmit a signal from the central office to the end user. In such an arrangement, the first end of the optical fiber is typically located at the central office while the second end of the optical fiber is typically provided at an end user location. An Optical Time Domain Reflectometer (OTDR) is frequently used at one end of the optical fiber to help determine if an optical signal can be effectively transmitted to the other end of the optical fiber. However, current methods typically involve using the OTDR to identify an event by monitoring light beam reflections of 4% or less. Reflections of 4% or less result from naturally occurring events such as a broken portion of the fiber, a cleaved or polished end of the fiber, and/or other naturally occurring events from the fiber. Only monitoring for natural events from one end of the optical fiber can have disadvantages. For example, a naturally occurring event may be mistakenly identified as the other end of the optical fiber. In another example, in an effort to diagnose a potential problem, another test is commonly performed at the other end of the optical fiber.

SUMMARY

In one example aspect, a method of analyzing an optical fiber is provided. The optical fiber includes a length extending between a first end and a second end of the optical fiber. The method comprises the step of transmitting a beam of light through the length of the optical fiber in a first direction from the first end toward the second end of the optical fiber. The method further comprises the step of reflecting the light beam with a highly reflective event at the second end of the optical fiber such the light beam reflects back in a second direction opposite the first direction. The method also comprises the step of identifying the second end of the optical fiber by monitoring at least the reflected light beam.

In another example aspect, a device is provided that is configured to be removably mounted with respect to an end of an optical connector. The device comprises a reflective surface configured to provide a highly reflective event to reflect a beam of light back through an optical fiber supported by the optical connector.

In yet another example aspect, an optical assembly is provided with an optical connector including an optical fiber. The optical assembly further includes a device configured to be removably mounted with respect to the optical connector. The device includes a reflective surface configured to provide a highly reflective event to reflect a beam of light at an end of the optical fiber back through the optical fiber.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

Figure 1:
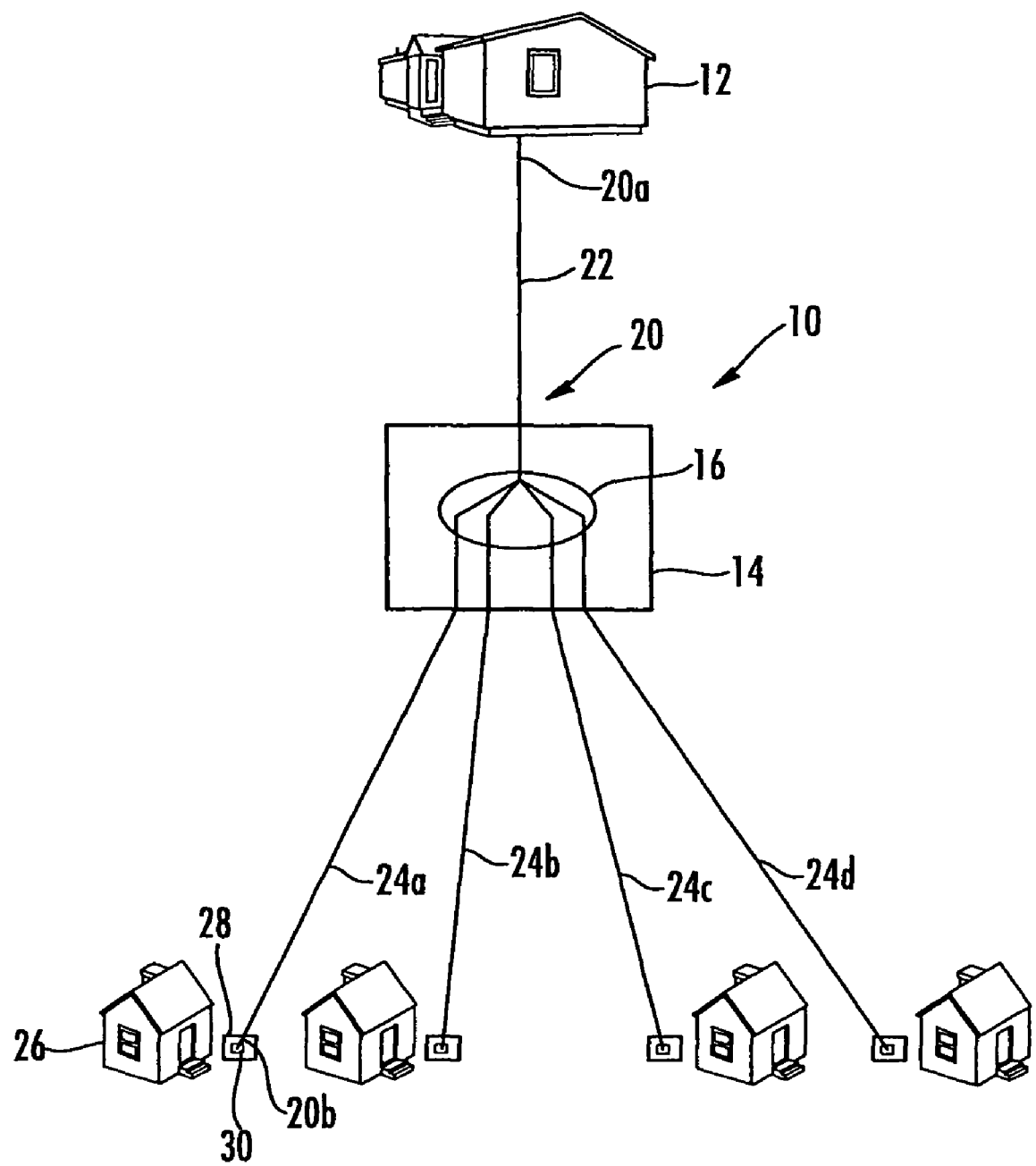
FIG. 1 is a schematic view of an optical fiber including a feeder optical fiber segment and a drop cable segment.

The present invention will now be described more fully hereinafter with reference to the accompanying drawings in which example embodiments of the invention are shown. Whenever possible, the same reference numerals are used throughout the drawings to refer to the same or like parts. However, this invention may be embodied in many different forms and should not be construed as limited to the embodiments set forth herein. These example embodiments are provided so that this disclosure will be both thorough and complete, and will fully convey the scope of the invention to those skilled in the art.

Concepts of the present invention include methods and devices for testing an optical fiber. Methods of analyzing can be provided for an optical fiber including a single fiber segment or a plurality of fiber segments that may be joined together by connectors, splitters and/or other optical devices wherein the optical fiber provides a path for a beam of light along a length of the optical fiber extending between a first end and a second end of the optical fiber. In still further examples, concepts of the present invention can be used with a plurality of fibers. For example, a plurality of fibers in the same ferrule of a connector can be used in accordance with aspects of the present invention. In still further examples, concepts of the present invention can be used with a single fiber. For example, a single fiber provided in a ferrule of a connector can be used in accordance with aspects of the present invention. For instance, a single fiber connector can be used in applications such as a one-fiber cable drop to a living unit or other location.

In one example, as shown in FIG. 1, an optical assembly 10 can be provided with an optical fiber 20 including a feeder optical fiber segment 22 extending between a central office 12 and a distribution point 14. The optical fiber 20 can further include one or more of a plurality of drop cable segments 24a-24d extending between the distribution point 14 and an end user 26. In the illustrated example, the distribution point 14 can include an optional splitter 16 designed to transmit a selected signal traveling along the feeder optical fiber segment 22 to a desired end user 26. The end user 26 can comprise a residence (e.g., multi-dwelling living unit, home or the like), business, locked area or other location designed to receive information by way of the optical fiber 20. Therefore, in one example, the optical fiber 20 can include two segments including the feeder optical fiber segment 22 and a corresponding drop cable segment 24a-24d. The feeder optical fiber segment 22 includes a first end 20a located at the central office 12 while the corresponding drop cable segment 24a-24d includes a second end 20b at the location of the end user 26. While the optical fiber 20 is illustrated with two segments, further examples of optical fibers may have a single or more than two optical fiber segments. The configuration illustrated in FIG. 1 is just one of a variety of configurations that can benefit from aspects of the present invention. Therefore, it is understood that aspects of the present invention can be used with any system that has at least one optical fiber segment with a first end and a second end with a length extending between the first end and the second end. Moreover, the length extending between the first end and second end can comprise a portion of the overall length of the fiber or substantially the entire length of the fiber between the first end and the second end. The present invention can be used with other configurations and testing can occur at a variety of locations along at least one segment of an optical fiber and can be used with configurations that include a single optical fiber segment or a plurality of optical fiber segments. The optical assembly 10 of FIG. 1 can comprise a Fiber to the Home (FTTH) assembly although other applications are possible in further assemblies wherein like components may have different terminology while still incorporating aspects of the present invention.

As further shown in FIG. 1, an optional device 30 can be provided at the second end 20b of the optical fiber 20. In one example, the device can be mounted directly to a cleaved end of the optical fiber 20. As described more fully below, and shown in FIGS. 2A-2D and 3-7, further example devices 30 can be configured for removable mounting with respect to an optical connector 50. The device 30 can be installed during manufacture of the optical fiber 20 to save time during on-site installation. For example, an end of the drop cable segment 24a can be provided with the device when manufacturing the drop cable segment. Alternatively, the device 30 can be subsequently mounted after manufacturing the drop cable segment 24a and/or can be installed on-site. Furthermore, the devices 30, if provided, can be designed to retrofit or otherwise be used with existing installations to permit subsequent installation of the devices on the second end of an existing optical fiber. As shown in FIG. 1, the device 30 can be optionally stored within a Network Interface Device (NID) 28 or an Optical Network Terminal (ONT) at the location of the end user 26.

Configurations (e.g., devices 30) and methods can permit the optical fiber 20 to be analyzed without revisiting the second end of the optical fiber 20 at the location of the end user 26. Indeed, bidirectional testing of the optical fiber 20 is possible by performing a single test procedure at a single transmission point, such as the first end 20a of the optical fiber 20. Therefore, an operator can perform the analysis from just one location without having to coordinate analysis from multiple locations along the optical fiber. For instance, an operator can perform the analysis from a single end of the optical fiber without having to coordinate analysis from both ends of the optical fiber. Furthermore, the methods of the present invention can also confirm that a light beam is traveling to the second end of the optical fiber without having to measure the length of the optical fiber. Indeed, an Optical Return Loss (ORL) monitor, such as an Optical Time Domain Reflectometer (OTDR) can be designed to confirm the existence of the second end of the optical fiber by simply monitoring the reflected light beam.

Methods and configurations (e.g., devices) herein can provide a Highly Reflective Event (HRE) such as a Totally Reflective Event (TRE). For example, the light beam reaching the second end 20b of the optical fiber 20 can be reflected by an HRE wherein greater than 4% of the light emitted is reflected back in the opposite direction. In further examples, the HRE can reflect greater than 10%, 20%, 30%, 40%, 50%, 60%, 70%, 80% or 90% of the light emitted. The HRE can induce a reflection greater than that which would normally be seen "in nature" for the purpose of identifying the second end 20b of the optical fiber 20 as unique from other events, such as cleaves, connectors, breaks, or other discontinuities. On one example, the HRE can comprise a TRE wherein greater than 95%, 96%, 97%, 98%, 99% or approximately 100% of the transmitted light is reflected backwards. A TRE is a type of HRE that is a mirror-like event that returns all or nearly all light. The TRE can be effective to produce an artificial source beam transmission at the second end as if initially transmitted from the second end. Thus, the TRE can help produce a bi-directional trace based upon a beam of light shot from one end of the fiber.

Providing an HRE, such as a TRE can provide a wide variety of advantages. In one example, the HRE, such as the TRE, can avoid improperly identifying an event (e.g., a cleave, connector, break, or other discontinuity) as the end of the optical fiber. Moreover, providing the HRE, such as the TRE, can help identify one or more events along the length of the fiber. For instance, the existence of the events can be determined and/or the amount of loss associated with the events can be determined. In further examples, a TRE can help estimate an optical loss at the second end of the optical fiber, such as an optical loss from a connector at the second end of the optical fiber.

Figure 2A:
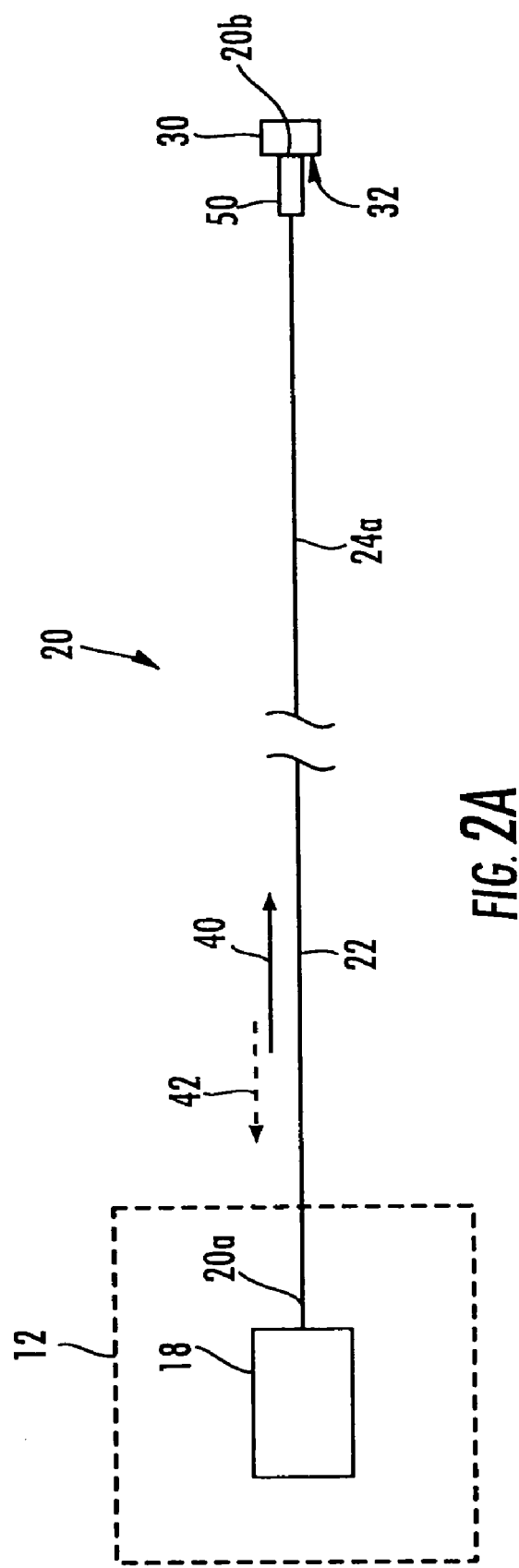
FIG. 2A is a schematic view of the optical fiber of FIG. 1 illustrating a beam of light being transmitted through a length of the optical fiber in a first direction and a first backscatter of light moving in a second direction opposite the first direction.

Example method steps of the present invention are schematically shown in FIGS. 2A-2D. As shown in FIG. 2A, the method includes the steps of transmitting a beam of light 40 through a length of the optical fiber in a first direction from the first end 20a toward the second end 20b of the optical fiber 20. As shown, the light beam 40 can comprise a laser beam although other beams of light may be used in further examples. The light beam 40 is also shown to comprise a pulse of light although a continuous light beam may be used in further examples.

A light source can be used to transmit the light beam 40. In one example, the light source can be operably connected to the first end 20a of the optical fiber 20 although the light source may be provided at other locations intermediate the first and second end of the optical fiber. A testing device can also be provided that is configured to monitor a reflected light beam. For example, the testing device can comprise an ORL meter configured to monitor a reflected light beam. Although not required, the ORL can comprise an OTDR, as illustrated schematically by reference number 18 in FIGS. 2A-2D. As further shown, the light source and the testing device may be incorporated as a single test apparatus, such as an OTDR, although the light source and the testing device may be provided separately in further examples. While the testing is shown to occur at the first end 20a of the optical fiber, it is also contemplated that further examples may provide the testing device at other locations, such as a position intermediate between the first end 20a and the second end 20b of the optical fiber 20. In further examples, the ORL meter, such as an OTDR, may even be operably connected to the second end 20b of the optical fiber 20 during the testing procedure.

As further illustrated in FIG. 2A, the light beam 40 traveling in the first direction can provide a first backscatter of light 42 that moves back in a second direction opposite the first direction. In example embodiments, the first backscatter of light 42 can travel back to be monitored by the testing device 18.

Figure 2B:
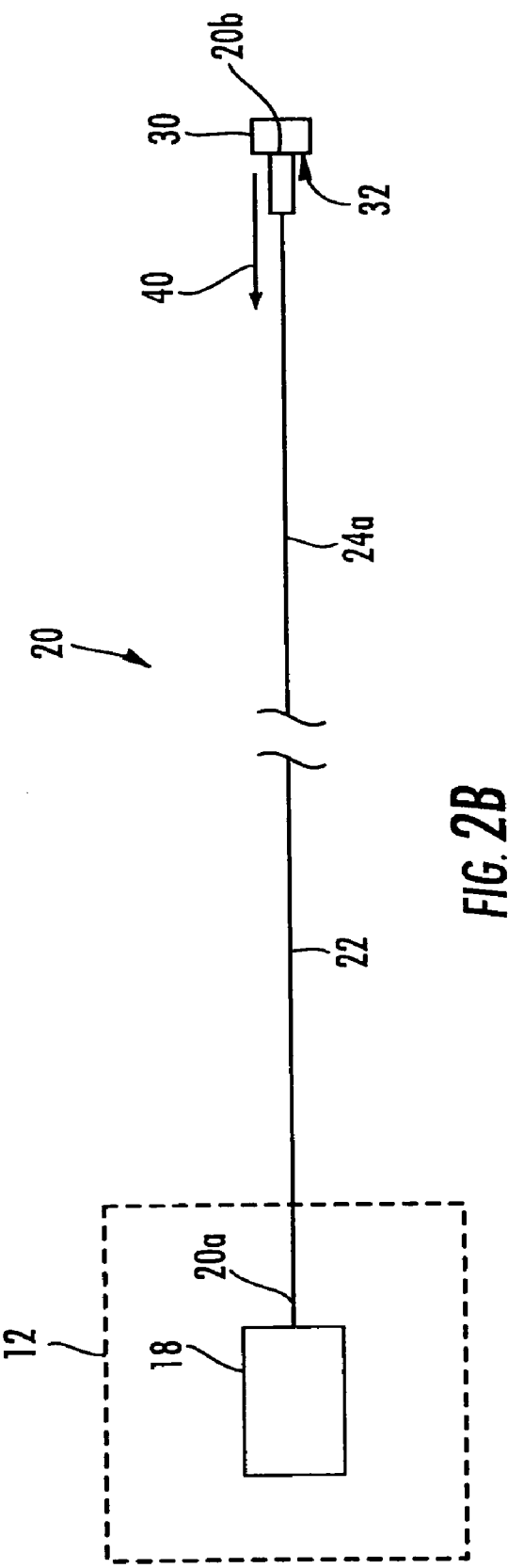
FIG. 2B is a schematic view of the optical fiber of FIG. 1 illustrating the light beam being reflected at the second end of the optical fiber back in the second direction.
Figure 2C:
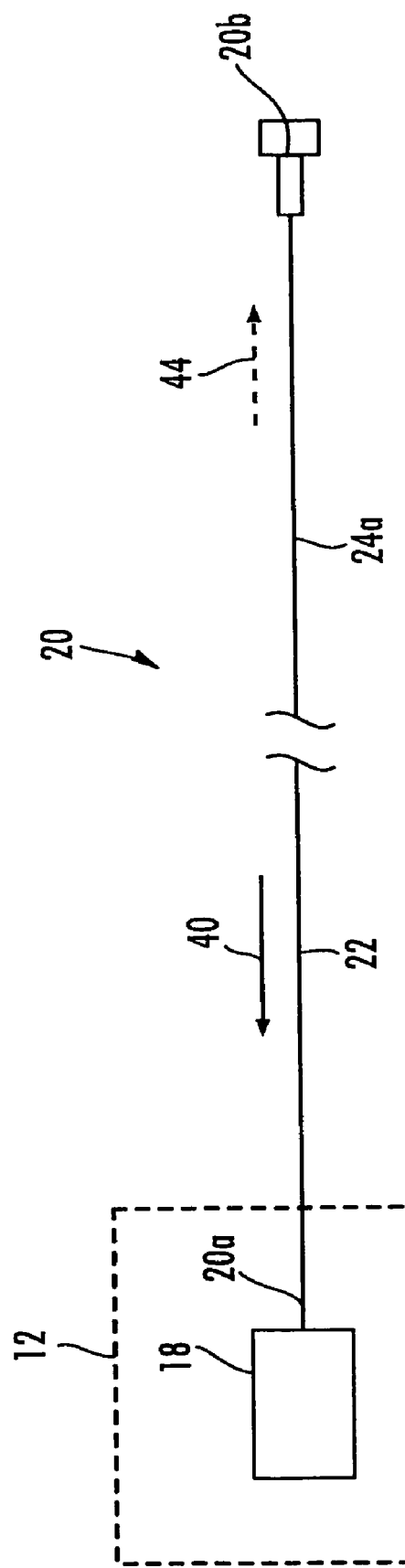
FIG. 2C is a schematic view of the optical fiber of FIG. 1 illustrating the reflected light beam traveling in the second direction and providing a second backscatter of light that moves back in the first direction.
Figure 2D:
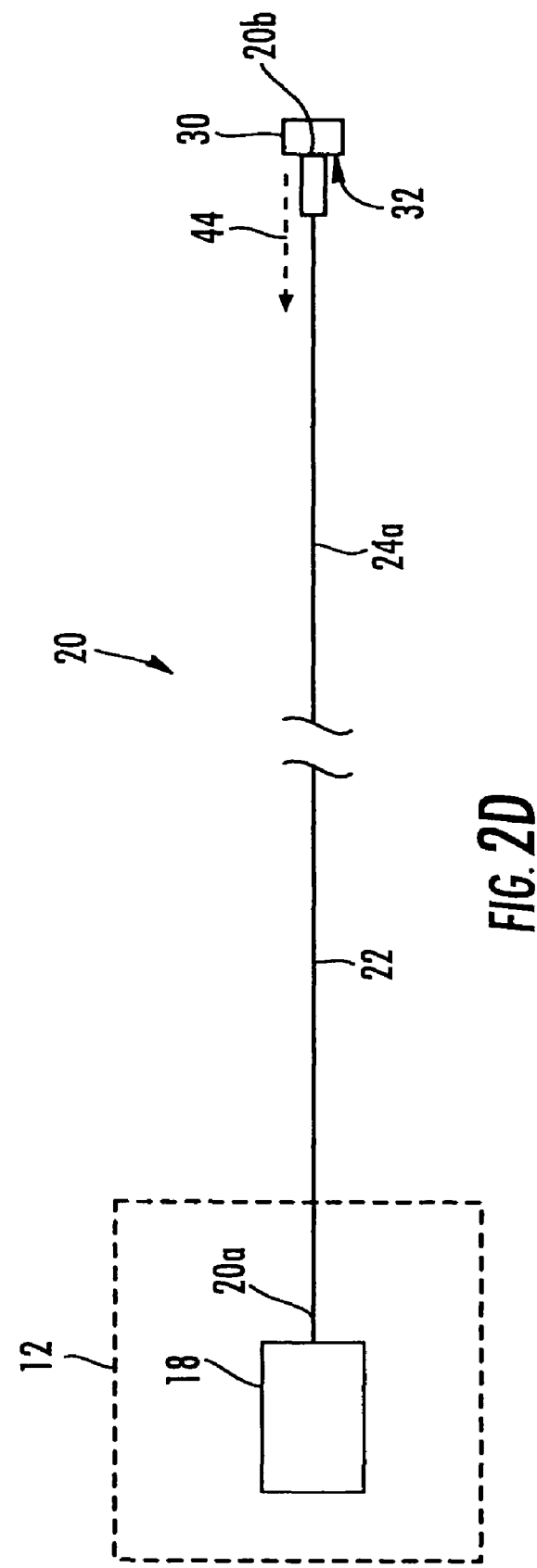
FIG. 2D is a schematic view of the optical fiber of FIG. 1 illustrating the second backscatter of light being reflected at the second end of the optical fiber back in the second direction.

As shown in FIG. 2B, the HRE, such as the TRE, can cause reflecting of the light beam 40 at the second end 20b of the optical fiber 20 back in the second direction. As illustrated in FIG. 2C, the reflected light beam 40 can travel back towards the first end 20a in the second direction to be monitored by the testing device 18. As shown, if an optical connector 50 is provided prior to testing, the light beam 40 can be reflected by the HRE, such as the TRE, from the optical connector 50 back in the second direction. For instance, as described more fully below, the light beam 40 can be reflected by the HRE, such as the TRE, from an end of an optical fiber supported by the optical connector 50.

As further shown in FIG. 2C, the reflected light beam 40 can also provide a second backscatter of light 44 that moves back in the first direction towards the second end 20b. As further shown in FIG. 2D, the HRE, such as the TRE, can cause reflection of the second backscatter of light 44 at the second end 20b of the optical fiber 20 back in the second direction. The reflected second backscatter of light 44 can thereafter travel back to be monitored by the testing device 18. As shown, if an optical connector 50 is provided prior to testing, the second backscatter of light 44 can be reflected by the HRE, such as the TRE, from the optical connector 50 back in the second direction. For instance, as described more fully below, the second backscatter of light 44 can be reflected by the HRE, such as the TRE, from an end of an optical fiber supported by the optical connector 50.

Example methods of the present invention can monitor at least the reflected light beam to analyze the optical fiber. Thus, examples of the present invention can simply monitor for the light beam reflected by the HRE, such as the TRE, without monitoring the first backscatter of light or the reflected second backscatter of light. In further examples, methods of the present invention can monitor the first backscatter of light in addition to the light beam reflected by the HRE, such as the TRE. In addition or alternatively, methods of the present invention can monitor the reflected second backscatter of light in addition to the reflected light beam. For example, methods of the present invention can monitor the first backscatter of light, the reflected light beam, and the reflected second backscatter of light.

In accordance with examples of the present invention, a reflective surface 32 can be positioned with respect to the second end 20b of the optical fiber 20. The reflective surface 32 can be effective to provide the HRE, such as the TRE, for the light beam 40 and, in further examples, the second backscatter of light 44 as well. In one example, the reflective surface 32 can be positioned with respect to an end of an optical fiber before splicing or providing the second end of the optical fiber with an optical connector. In another example, the reflective surface 32 can be positioned with respect to an optical connector 50, such as an end of the optical connector prior to testing.

The reflective surface can be part of the optical fiber or can be provided separate from the optical fiber. For instance, the reflective surface can be provided by conditioning the second end, such as providing a reflective coating on the second end of the optical fiber. In one example, a peel-off seal can be used that also provides the desired reflective event while permitting easy subsequent removal upon completion of the testing procedure. In further examples, a device 30 can be provided for mounting with the reflective surface 32. In such examples, the reflective surface may be spaced away from the second end 20b of the optical fiber 20. In such examples, the reflective surface may be designed to focus reflected light through the space to reenter the core of the optical fiber 20 at the second end 20b. In further examples, the reflective surface may abut and/or be biased to abut the second end 20b of the optical fiber.

As set forth above, example embodiments may include a device configured 30 to be removably mounted with respect to the second end 20b of the optical fiber. For example, as shown, the device 30 is configured to be removably mounted with respect to an end of the optical connector 50. In such examples, the reflective surface 32 is configured to reflect the beam of light 40 back through the optical fiber 20 supported by the optical connector 50. FIGS. 3-7 illustrate examples of devices although further devices may be used in accordance with aspects of the present invention.

Figure 3:
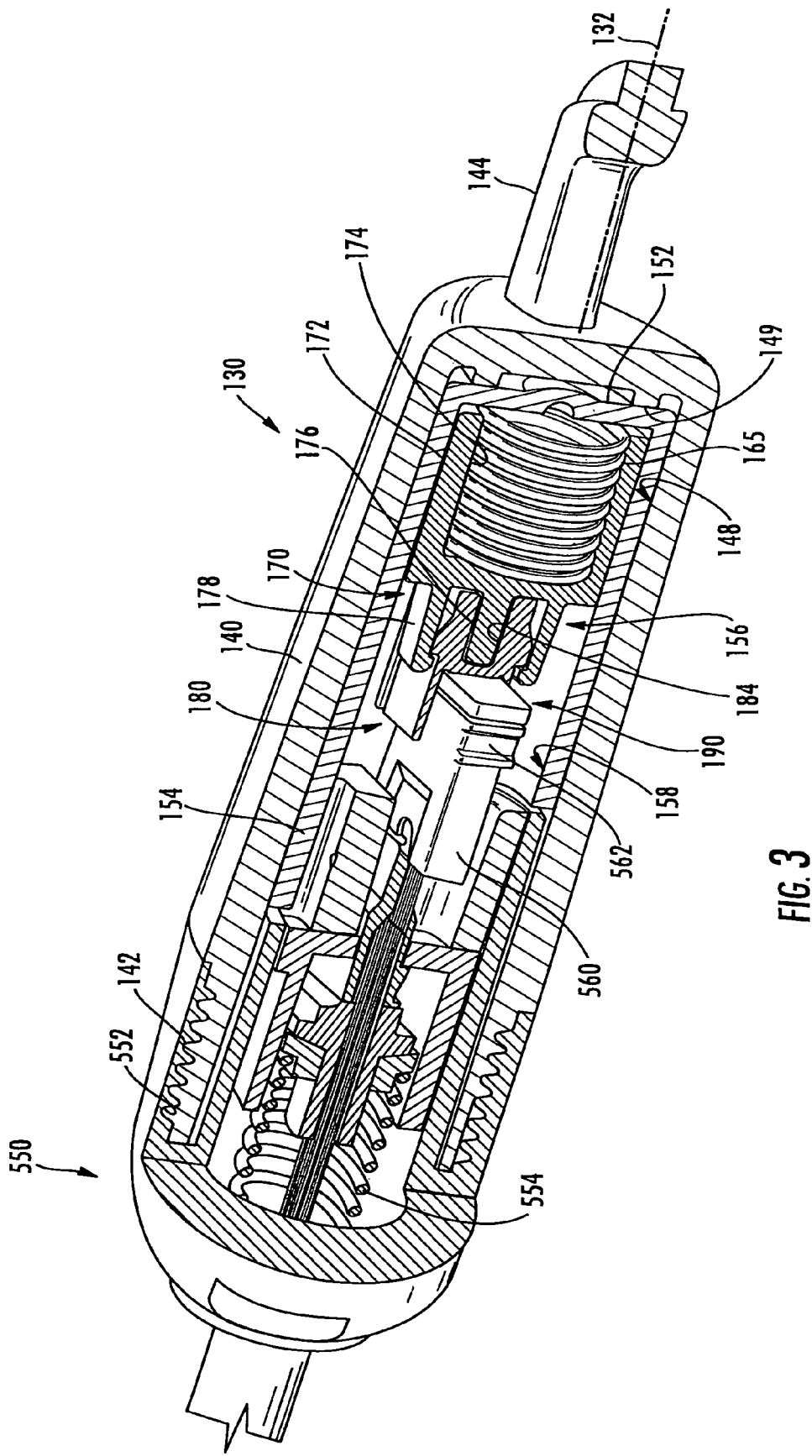
FIG. 3 is a partial sectional view of an optical assembly comprising an optical connector and a device removably mounted with respect to the optical connector.
Figure 4:
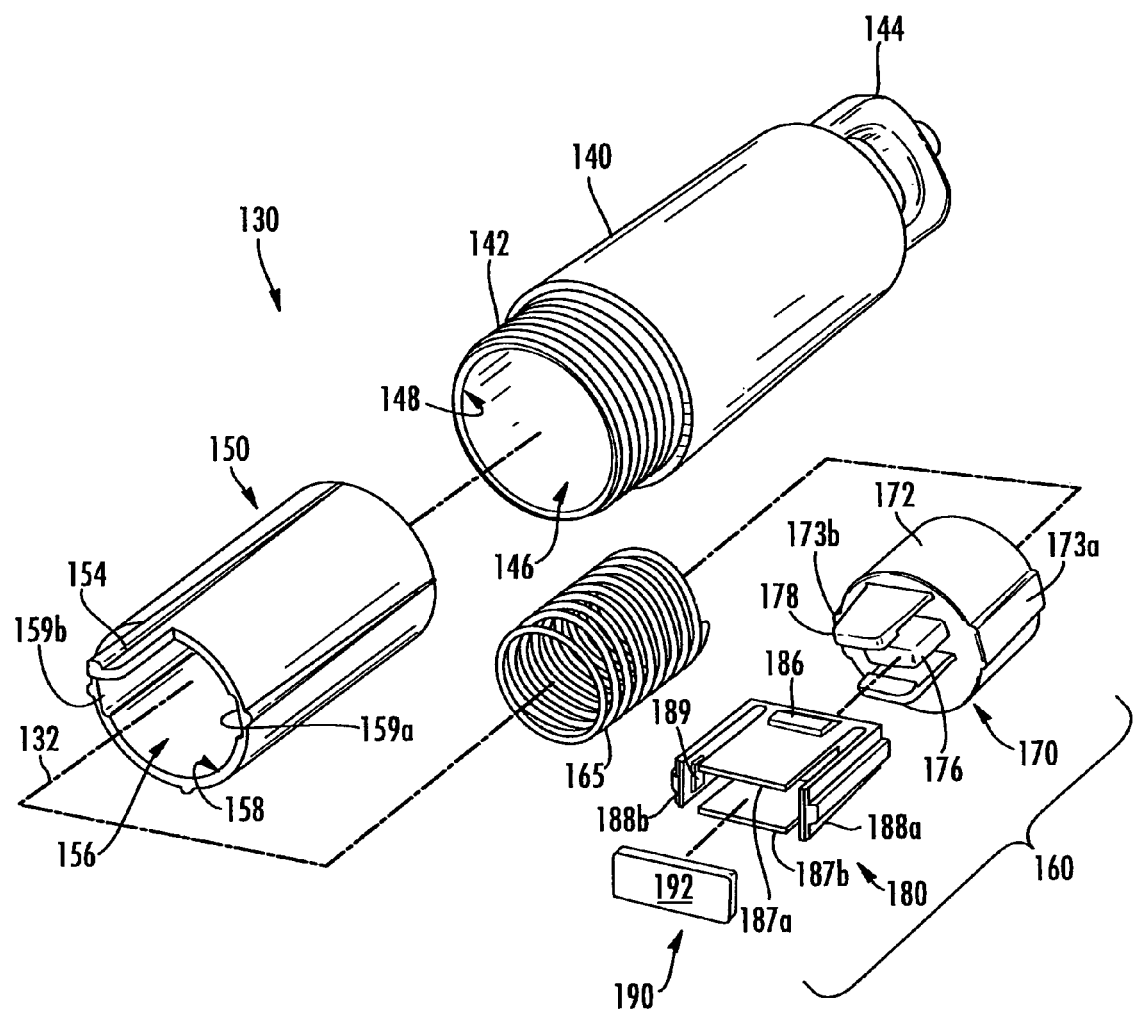
FIG. 4 is an exploded view of the device of FIG. 3.
Figure 5:
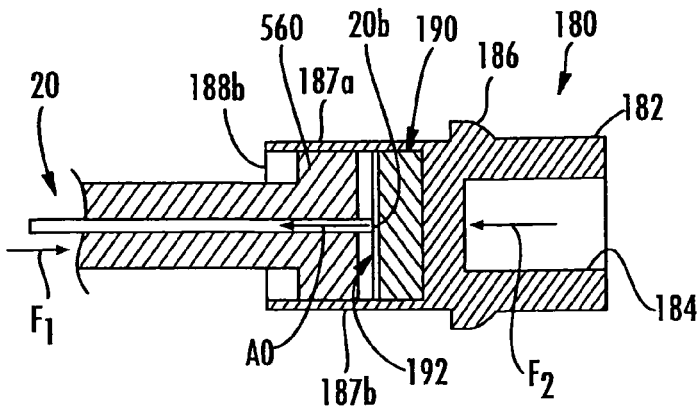
FIG. 5 is a sectional view of portions of the device of FIG. 3 illustrating the reflective surface being biased against the end of the optical fiber.

FIGS. 3-5 illustrate one example device 130 in accordance with aspects of the present invention. The device 130 is configured to be removably mounted with respect to an optical connector 550. For example, as shown, the device 130 can include an optional cap 140 with a threaded end 142 configured to engage a corresponding threaded portion 552 of the optical connector 550. The threaded portion 552 of the optical connector 550 is shown to include a female threaded portion configured to receive a male threaded end 142 of the cap 140. In further examples, the cap can include a female threaded portion configured to receive a male threaded portion of the optical connector. Moreover, other configurations, such as friction fit, nonthreaded, or other connections can be provided for removably mounting devices with respect to optical connectors in accordance with aspects of the present invention.

As shown, the optional cap 140 can be configured to at least partially receive the end of the optical connector 550. For instance, as shown, the ferrule 560 of the optical connector is configured to be entirely received within the cap 140 although the ferrule 560 may be partially received within the cap 140 in further examples. The cap can include an optional eyelet 144 that may facilitate rotation of the cap 140 with respect to the optical connector 550. The eyelet 144 can also permit the cap 140 to be hung within the network interface device 28 and/or facilitate support of the device 130 and/or the optical connector 550 removably mounted to the device 130. The cap 140 further includes a cavity 146 defined by a cavity wall 148. As shown, the cavity wall 148 may be cylindrical shape with a circular cross section although other shapes may be used in further examples.

The optical connector 550 can further include a sleeve 150 configured to be axially inserted into the cavity 146. An end wall 152 of the sleeve 150 can abut a bushing member 149 within the cavity 146 of the cap 140. The sleeve 150 can be configured to be keyed into the optical connector 550 such that the sleeve 150 is substantially inhibited, such as prevented, from rotating with respect to the optical connector 550 about an axis 132 of the device 130. For example, as shown in FIGS. 3 and 4, the sleeve 150 includes a male key portion 154 configured to be received within a female portion defined by the optical connector 550. The sleeve 150 can also be configured to be rotatably received within the cavity 146 of the cap 140. For example, as shown, the sleeve 150 can include a cylindrical sleeve with a circular outer cross-sectional periphery configured to be received within cavity 146. The bushing member 149 of the cap 140 can reduce surface area contact, and therefore, the friction between the sleeve 150 and the cap 140 as the cap rotates relative to the sleeve 150. The sleeve 150 further includes a cavity 156 defined by an interior surface 158. As shown, the interior surface 158 can define a key portion such as a tongue or groove portion. For example, as shown, the key portion includes at least one groove, such as the illustrated pair of opposed grooves 159a, 159b.

The device 130 can further include a carriage member 160 configured to be at least partially received within the cavity 156 of the sleeve 150. The carriage member 160 can comprise a single integral component or multiple components configured to be attached together. As shown in the illustrative example, the carriage member 160 can comprise a first holder element 170, a second holder element 180 and a reflective element 190. The first holder element 170 can include a shroud 172 with an interior cavity 174 configured to receive a biasing device 165. As shown, the biasing device 165 can comprise a coil compression spring although leaf springs, elastomeric material or other components configured to provide a biasing force can be incorporated in accordance with aspects of the present invention. The first holder element 170 can further include a key portion configured to interact with the key portion of the sleeve 150 to define a linear translation path between the first holder element 170 and the sleeve 150. As shown in the illustrative example, the key portion can comprise at least one tongue, such as the illustrated opposed tongues 173a, 173b configured to be respectively received by the opposed grooves 159a, 159b of the sleeve 150. The interaction between the tongues 173a, 173b and the grooves 159a, 159b permits a relative linear translation and inhibits, such as prevents, relative rotation between the first holder element 170 and the sleeve 150.

The first holder element 170 can also include another key portion configured to interact with a corresponding key portion of the second holder element 180. For example, the first holder element 170 can include another tongue 176 configured to be received in a groove 184 defined in a base 182 of the second holder element 180. The interaction between the tongue 176 of the first holder element 170 and the groove 184 of the second holder element 180 inhibits, such as prevents, relative rotation between the holder elements 170, 180. The first holder element 170 can also include an attachment device configured to attach the holder elements 170, 180 together. For example, the first holder element 170 can include a pair of snap tabs 178 configured to engage snap protrusions 186 extending from the base 182 of the second holder element 180.

The second holder element 180 can also include a seat structure configured to hold the reflective element 190 and receive the ferrule 560 of the optical connector 550. For example, the seat structure can comprise a first pair of opposed tabs 187a, 187b and a second pair of opposed tabs 188a, 188b. The first pair of opposed tabs 187a, 187b can be spaced a distance to receive a height of the reflective element 190 while the second pair of opposed tabs 188a, 188b can be spaced a distance to receive a width of the reflective element 190. The reflective element 190 can be press fit into the first and second pair of opposed tabs and seated relative to the base 182. The reflective element 190 can be attached to the second holder element 180 by way of a friction fit although other connections may be incorporated in further examples. For instance, the first pair and/or the second pair of tabs may be provided with snap protrusions configured to snap the reflective element 190 in place.

As shown in FIG. 5, the reflective element 190 can include a reflective surface 192. In one example, the reflective surface can comprise a polished surface of a base 194. As shown, further examples can provide the reflective surface 192 as a coating of material over the base 194. In one example, the base 194 can comprise a ceramic plate while the coating of material can comprise a metallic layer of material. In one example, the metallic layer can comprise a layer of gold although aluminum or other reflective material may be used in further examples.

During assembly, the sleeve 150 may be inserted within the cavity 146 of the cap 140 until the end wall 152 of the sleeve 150 abuts the bushing member 149 of the cap 140. The carriage member 160 can then be assembled by inserting the reflective element 190 into the seat structure of the second element 180 until the reflective element 190 is positioned with respect to the base 182 of the second holder element 180. The second holder element 180 can then be positioned with respect to the first holder element 170 such that the tongue 176 of the first holder element is received within the groove 184 of the second holder element 180. The first and second holder element 170, 180 are then pressed together until the snap tabs 178 of the first holder element 170 snappingly engage the snap protrusions 186 of the second holder element. Once the carriage member 160 is assembled, the first end of the biasing device 165 can then be inserted into the interior cavity 174 of the first holder element 170 with a second end of the biasing device 165 extending outside of the first holder element 170. The carriage member 160 together with the biasing device 165 can then be inserted into the cavity 156 of the sleeve 150 such that the opposed tongues 173a, 173b are received in the respective grooves 159a, 159b of the sleeve 150.

The assembled device 130 can also be removably mounted to the optical connector 550 in the following manner. First, the device 130 is axially moved with respect to the optical connector 550 such that the male key portion 154 is received in the corresponding female key portion of the optical connector 550 and the threaded end 142 of the cap 140 is threadingly engaged with the corresponding threaded portion 552 of the optical connector 550. The cap 140 can then be rotated relative to the optical connector 550 such that the threaded end 142 and threaded portion 552 cause the bushing member 149 to press against the end wall 152 of the sleeve 150. At the same time, the male key portion 154 of the sleeve 150 inhibits, such as prevents rotation of the sleeve 150 relative to the optical connector 550. As the bushing member 149 presses against the sleeve 150, the carriage member 160 is urged toward the connector. The seat structure of the second element 180 then receives the end of the ferrule 560 until the second end 20*b* abuts the reflective surface 192. Continued rotation of the cap 140 relative to the optical connector 550 causes the reflective surface to be biased against the second end 20*b* of the fiber 20. Indeed, the biasing member 554 of the optical connector 550 can generate a first force $F_1$ while the biasing member 165 of the device 130 can generate a second force $F_2$ opposite the first force. The first force $F_1$ urges the second end 20*b* of the fiber toward the reflective surface 192 while the second force $F_2$ urges the reflective surface 192 toward the second end 20*b* of the optical fiber 20. Once the connection is complete, protrusions 189 located on the interior surface of the second pair of opposed tabs 188*a*, 188*b* can engage grooves 562 formed on the sides of the ferrule 560 to help maintain the engagement between the second end 20*b* of the optical fiber 20 and the reflective surface 192. Biasing the second end 20*b* against the reflective surface 192 can facilitate a totally reflective event (TRE) at the second end 20*b* of the optical fiber 20.

Figure 6A:
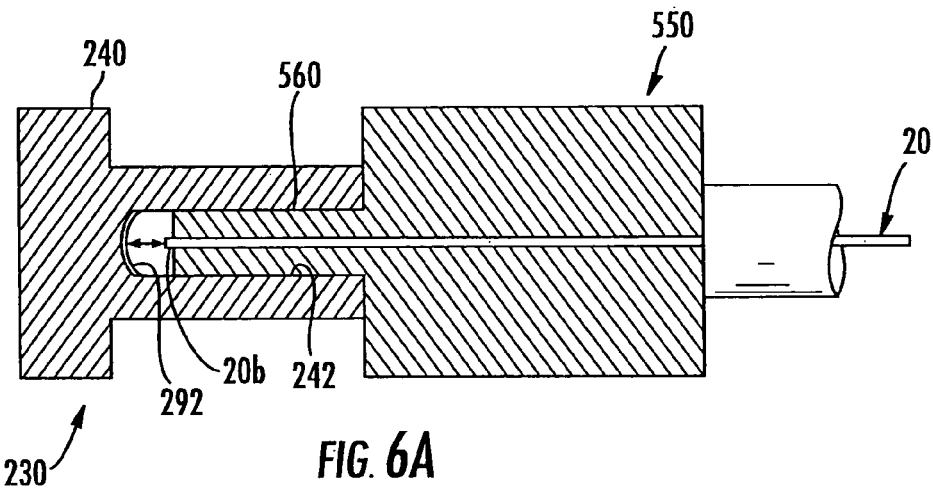
FIG. 6A is a schematic sectional view of another optical assembly including a device comprising a cap with a reflective surface provided on an inner surface of the cap.

FIG. 6A is a schematic illustration of another example of a device 230 in accordance with aspects of the present invention. As shown, the device 230 is configured to be removably mounted with respect to the optical connector 550. The device 230 includes a cap 240 including a cavity 242 configured to at least partially receive an end of an optical connector. For example, as shown, the cavity 242 of the cap 240 is configured to receive an end of the ferrule 560 of an optical connector 550. As shown, the device 230 includes a reflective surface 292 provided on an inner surface of the cap 240 defining the cavity 242. The reflective surface 292 can comprise a polished surface of a cap 240. As shown, further examples can provide the reflective surface 292 as a coating of material over the inner surface of the cap 240 defining the cavity 242. In one example, the coating of material can comprise a metallic layer of material. For instance, the metallic layer can comprise a layer of gold although aluminum or other reflective material may be used in further examples. The coating of material can also be shaped in further examples. For instance, as shown in FIG. 6A, the coating of material can be shaped to focus a light beam being transmitted from the second end 20*b* of the optical fiber back into the optical fiber core in an opposite direction. As shown, the second end 20*b* can be spaced from the coating of material in order to minimize contamination or damage to the second end 20*b* of the optical fiber. Providing the second end 20*b* at a spaced position from the coating of material can be effective to facilitate a highly reflective event (HRE) at the second end 20*b* of the optical fiber 20.

Figure 6B:
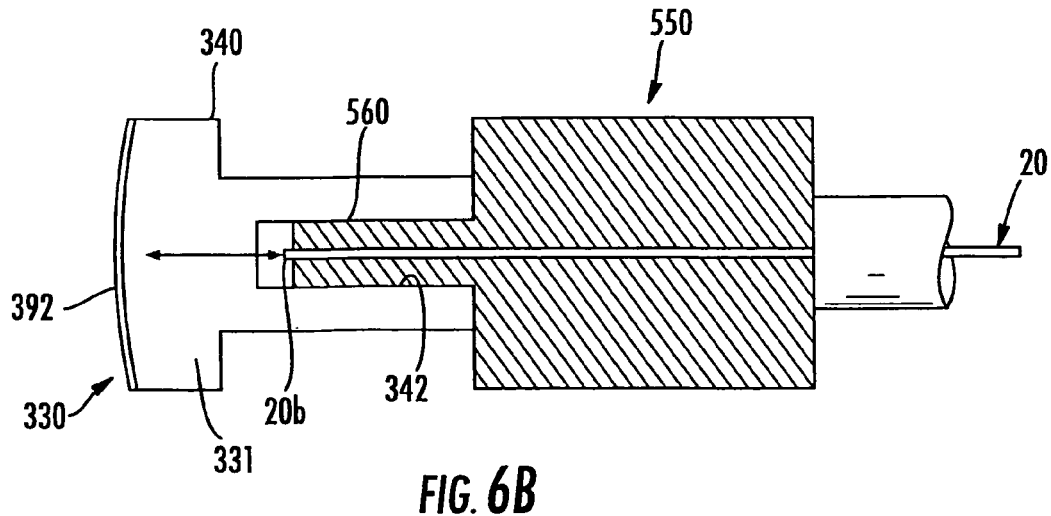
FIG. 6B is a schematic sectional view of another optical assembly including a device comprising a cap including a substantially transparent portion and a reflective surface located on an outer surface of the transparent portion.

FIG. 6B is yet another schematic illustration of a device 330 in accordance with further aspects of the present invention. As shown, the device 330 is configured to be removably mounted with respect to the optical connector 550. The device 330 includes a cap 340 similar to the cap 240 discussed above. Indeed, the cap 340 includes a cavity 342 configured to at least partially receive an end of an optical connector. For example, as shown, the cavity 342 of the cap 340 is configured to receive an end of the ferrule 560 of an optical connector 550. However, the cap 340 includes a substantially transparent portion 331 and the cap 340 includes a reflective surface 392 located on an outer surface of the transparent portion 331. The reflective surface 392 can comprise a polished outer surface of the cap 340. As shown, further examples can provide the reflective surface 392 as a coating of material located on the outer surface of the transparent portion 331. In one example, the coating of material can comprise a metallic layer of material. For instance, the metallic layer can comprise a layer of gold although aluminum or other reflective material may be used in further examples. The coating of material can also be shaped in further examples. For instance, the coating of material can be shaped to focus a light beam being transmitted from the second end 20*b* of the optical fiber back through the transparent portion 331 and into the core of the optical fiber 20 in the opposite direction. As shown, the second end 20*b* can be spaced from the cap within the cavity 342 in order to minimize contamination or damage to the second end 20*b* of the optical fiber. Providing the second end 20*b* at a spaced position from the cap within the cavity 342 can be effective to facilitate a highly reflective event (HRE) at the second end 20*b* of the optical fiber 20.

Figure 7:
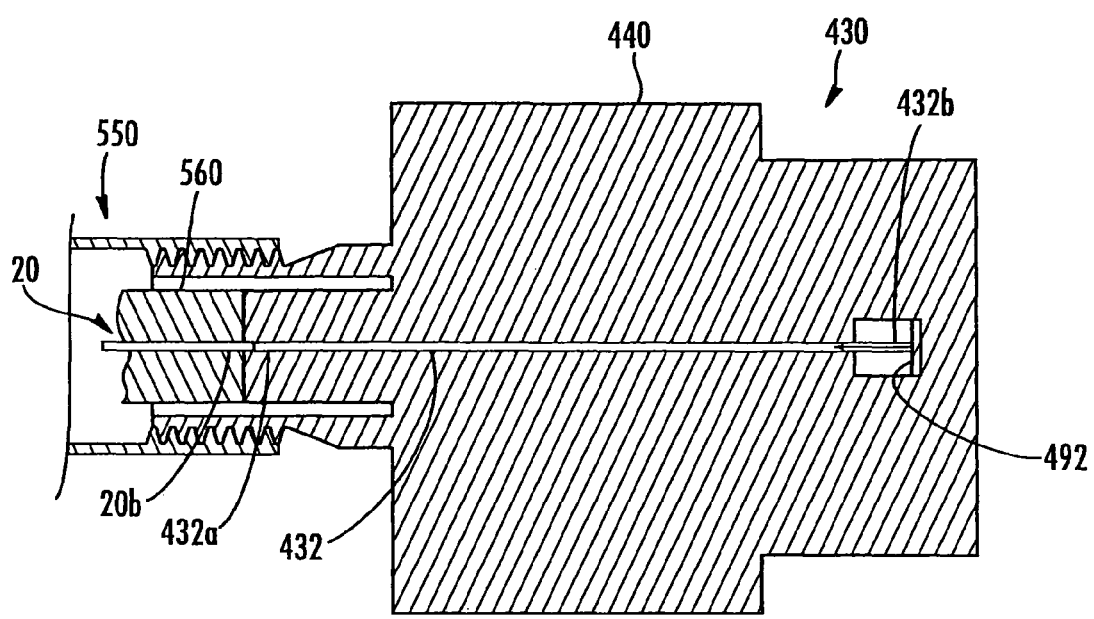
FIG. 7 a schematic sectional view of yet another optical assembly including a device comprising a ferrule with a fiber stub including a first end engaging an end of an optical fiber and a second end engaging a reflective surface of the device.

FIG. 7 illustrates still another schematic illustration of a device 430 in accordance with the present invention. As shown, the device 330 is configured to be removably mounted with respect to the optical connector 550. The device 430 includes a cap 440 with a fiber stub 432 including a first end 432*a* configured to engage the second end 20*b* of the optical fiber and a second end 432*b* configured to be positioned with respect to a reflective surface 492. The reflective surface 492 can comprise a polished inner or outer surface of the cap 440. In further examples, the reflective surface 492 can comprise a coating of material on an inner or outer surface of the cap 440. As shown, the reflective surface 492 is provided as a coating of material located on an inner surface the cap 440. In one example, the coating of material can comprise a metallic layer of material. For instance, the metallic layer can comprise a layer of gold although aluminum or other reflective material may be used in further examples. As shown in FIG. 7, the second end 432*b* of the fiber stub 432 can be configured to abut the reflective surface 492. Such a configuration can be useful to facilitate a totally reflective event (TRE) at the second end 20*b* of the optical fiber 20. In further examples, the second end 432*b* of the fiber stub 432 can be spaced from the reflective surface in a manner similar to the spacing between the second end and the reflective surface describe with respect to FIGS. 6A and 6B above. Such configurations can be useful to facilitate a highly reflective event (HRE) at the second end 20*b* of the optical fiber 20.

As discussed above, devices in accordance with the present invention can be provided with an optional cap. The cap can help protect the second end of the optical fiber. For example, the cap can comprise a modified dust cap typically placed over the ferrule at the second end of the optical fiber. Such a dust cap can protect the second end of the optical fiber from contamination and/or damage and can further provide for an HRE or TRE to facilitate testing of the optical fiber. While devices are shown used with a multifiber ferrule, it is contemplated that devices can be configured for use with a variety of ferrules, such as single fiber ferrules or the like.

As discussed above, the reflective surface can be shaped to focus a light beam being transmitted from the second end 20*b* of the optical fiber back into the core of the optical fiber 20 in the opposite direction. Various shapes can be used to produce the reflection, including, but not limited to flat, curved, spherical, hyperbolic, parabolic or the like. In examples, the device can be keyed in with respect to the optical connector in order to provide a desired orientation between the reflective surface and the second end of the optical fiber. In further examples, the desired reflective capability can be achieved without keying the device with respect to the optical connector. The shape and focusing ability of the cap can be configured such that both APC (angled physical contact) and UPC (ultra physical contact) connectors can achieve at least an HRE.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method of analyzing an optical fiber including a length extending between a first end and a second end of the optical fiber, the method comprising the steps of:
   transmitting a beam of light through the length of the optical fiber in a first direction from the first end toward the second end of the optical fiber;
   reflecting and focusing the light beam with a device providing a highly reflective event, the device comprising a concave reflective surface spaced apart from the second end of the optical fiber such that the light beam reflects back and is focused into the optical fiber in a second direction opposite the first direction, wherein the light beam traveling in the first direction provides a first backscatter of light that moves back in the second direction and the reflected light beam provides a second backscatter of light that moves back in the first direction;
   reflecting the second backscatter of light at the second end of the optical fiber back in the second direction; and
   identifying the second end of the optical fiber by monitoring at least the reflected light beam by monitoring the first backscatter of light, the reflected light beam, and the reflected second backscatter of light.

2. The method of claim 1, wherein the highly reflective event comprises a totally reflective event.

3. The method of claim 1, further comprising the step of providing an optical connector at the second end of the optical fiber, wherein the step of reflecting the light beam includes reflecting the light beam from the optical connector back in the second direction.

4. The method of claim 1, wherein an optical time domain reflectometer is used to monitor the reflected light beam.

5. The method of claim 1, further comprising the step of identifying a location of an event along the length of the optical fiber.

6. The method of claim 1, further comprising the step of using the monitored first backscatter of light, the monitored reflected light beam, and the monitored second backscatter of light to identify a location of an event along the length of the optical fiber.

7. The method of claim 1, wherein the step of identifying includes estimating an optical loss at the second end of the optical fiber.

8. The method of claim 7, wherein the light beam traveling in the first direction provides a first backscatter of light that moves back in the second direction and the reflected light beam provides a second backscatter of light that moves back in the first direction, the method further comprising the steps of reflecting the second backscatter of light at the second end of the optical fiber back in the second direction, and monitoring the first backscatter of light, the reflected light beam, and the reflected second backscatter of light to estimate the optical loss at the second end of the optical fiber.

9. The method of claim 1, further comprising transmitting the light beam within a substantially transparent region of the highly reflective event device in the first direction and the second direction between the second end of the optical fiber and the concave reflective surface.

10. The method of claim 1, wherein the concave reflective surface comprises a layer of gold or aluminum.

11. An optical assembly comprising:
    an optical connector comprising a ferrule and an optical fiber within the ferrule;
    a dust cap configured to be removably mounted with respect to an end of the optical connector, the dust cap comprising:
    a cavity wall defining a cavity, wherein an end of the cavity wall contacts the end of the optical connector and the ferrule is fully positioned within the cavity; and
    a concave reflective surface positioned within the cavity, wherein:
       the concave reflective surface is spaced apart from the end of the ferrule when the optical connector is fully positioned within the cavity and the cavity wall of the dust cap contacts the end of the optical connector such that the optical connector and the dust cap are in a connected state and
       the concave reflective surface is configured to provide a highly reflective event to reflect and focus a beam of light across at least a portion of the cavity and back through the optical fiber supported by the ferrule of the optical connector.

12. The optical assembly of claim 11, wherein the concave reflective surface is configured to provide a totally reflective event to reflect a beam of light back through the optical fiber supported by the optical connector.

13. The optical assembly of claim 11, wherein the dust cap includes a substantially transparent portion and the concave reflective surface is located on an outer surface of the transparent portion such that the beam of light is transmitted through the substantially transparent portion prior to being reflected and focused by the concave reflective surface.

14. The optical assembly of claim 11, further comprising a fiber stub within the ferrule including a first end configured to engage the end of the optical fiber and a second end spaced apart from the reflective surface.

15. The optical assembly of claim 11, wherein the concave reflective surface comprises a layer of gold or aluminum.

16. An optical assembly comprising:
    an optical connector comprising an optical fiber and a ferrule; and
    a device comprising:
       a cap comprising a cavity wall defining a cavity, the cap configured to be removably mounted with respect to the optical connector;
       a sleeve comprising an interior surface defining a sleeve cavity, wherein the sleeve is positioned within the cavity of the cap and the sleeve is configured to receive the optical connector such that a rotation of the optical connector with respect to the sleeve is substantially limited;
       a biasing device positioned within the sleeve cavity; and
       a carriage member comprising a first holder element, a second holder element, and a reflective element, wherein:
          the carriage member is positioned in the sleeve cavity such that the biasing device engages the first holder element to provide a bias force to the carriage member;
          the second holder element is coupled to the first holder element and comprises a seat structure; and
          the reflective element is positioned within the seat structure, and the seat member is configured to couple the ferrule to the second holder element such that an end of the optical fiber is engaged with the reflective element; and
       wherein the device provides a highly reflective event to reflect a beam of light at the end of the optical fiber back through the optical fiber.

17. The optical assembly of claim 16, wherein the ferrule comprises a fiber stub including a first end configured to engage the end of the optical fiber and a second end positioned with respect to the reflective surface.

18. The optical assembly of claim 16, wherein the reflective element is concave such that the beam of light is reflected and focused into the end of the optical fiber.

19. The optical assembly of claim 16, wherein the seat structure comprises a first pair of opposing tabs and a second pair of opposing tabs, and the first and second pair of opposing tabs engage the ferrule of the optical connector.

20. The optical assembly of claim 16, wherein the first holder element comprises a tongue, and the second holder element comprises a groove configured to receive the tongue of the first holder element.

21. The optical assembly of claim 16, wherein the first holder element is coupled to the second holder element by a snap engagement.

* * * * *